July 17, 1951 W. H. BLISS ET AL 2,560,922
COUNTER CONTROL CIRCUITS
Filed Oct. 21, 1949 2 Sheets-Sheet 1

INVENTORS
WARREN H. BLISS
IGOR E. GROSDOFF
BY Morris A. Rabkin
ATTORNEY

July 17, 1951 W. H. BLISS ET AL 2,560,922

COUNTER CONTROL CIRCUITS

Filed Oct. 21, 1949 2 Sheets-Sheet 2

INVENTORS
WARREN H. BLISS
IGOR E. GROSDOFF
BY Morris A. Rabkin
ATTORNEY

Patented July 17, 1951 2,560,922

UNITED STATES PATENT OFFICE 2,560,922

COUNTER CONTROL CIRCUITS

Warren H. Bliss and Igor E. Grosdoff, Princeton, N. J., assignors to Radio Corporation of America, a corporation of Delaware Application October 21, 1949, Serial No. 122,826

3 Claims. (Cl. 250—27)

This invention relates to counter control circuits and has for its principal object the provision of an improved control circuit which includes start and stop channels so interconnected with one another that (1) the application of a start pulse to the start channel is effective to lock out the start channel and to open the stop channel and (2) the application of a stop pulse to the stop channel is effective to lock out the stop channel. A further feature is an interlock connection which may be connected so that it is released either immediately after the application of the start pulse or after certain high frequency decades of the counter have completed their count.

More particularly, the improved control circuit includes (1) a pair of tubes one of which is connected in the start channel, the other of which is connected in the stop channel and both of which have two grids and a cathode lead resistor and (2) an interlock switch of the trigger circuit type having two stable current conducting conditions.

Associated with the interlock switch is a manually operated switch which conditions the interlock switch to be preset in either of its current conducting conditions. Under one of these preset conditions, (1) the application of a start pulse to the tube connected in the start channel is effective to lock out the start channel and to operate the interlock switch to a condition such that the stop channel is opened and (2) the application of a stop pulse is effective to operate the interlock switch to a condition such that the stop channel is locked out.

Under the other of these preset conditions of the interlock switch, a stop pulse derived from the counter is effective to lock out the stop channel.

The invention will be better understood from the following description considered in connection with the accompanying drawings and its scope is indicated by the appended claims.

Referring to the drawings.

Figure 1:
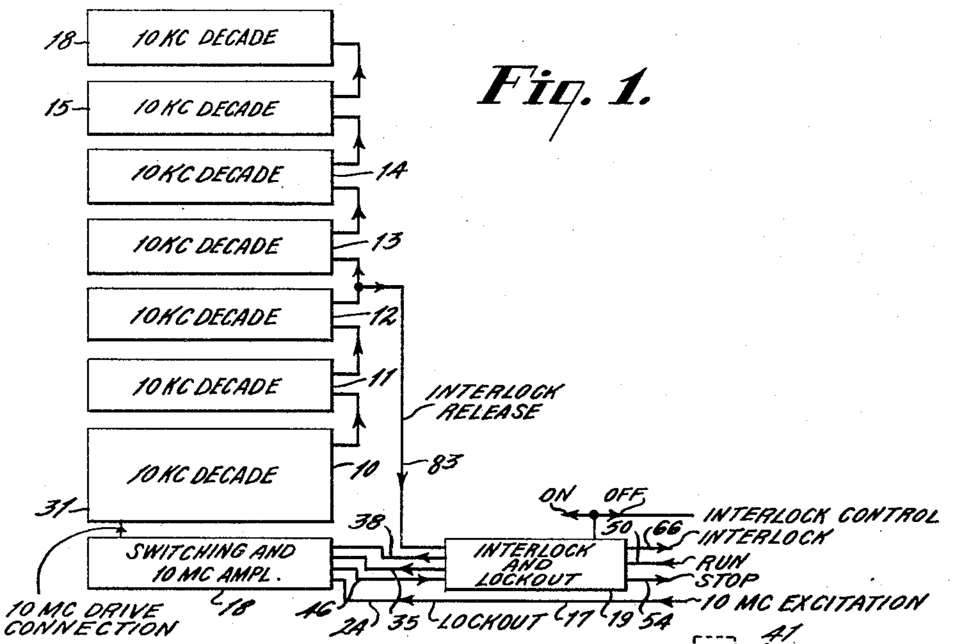
Figure 1 is a block diagram showing the relation of the improved control circuit to other parts of the apparatus. In this figure the circuit of the present invention is represented by the block 19.

The block diagram of Figure 1 shows a counter including seven decade sections 10 to 16. Each of these decades is similar to that disclosed by a copending application of Igor E. Grosdoff Serial No. 580,446, filed March 1, 1945, now Patent No. 2,521,788, in that it includes four trigger circuits which are connected in cascade and has feedback connections such that one output pulse is delivered for every ten pulses applied to the input of the decade.

Figure 2:
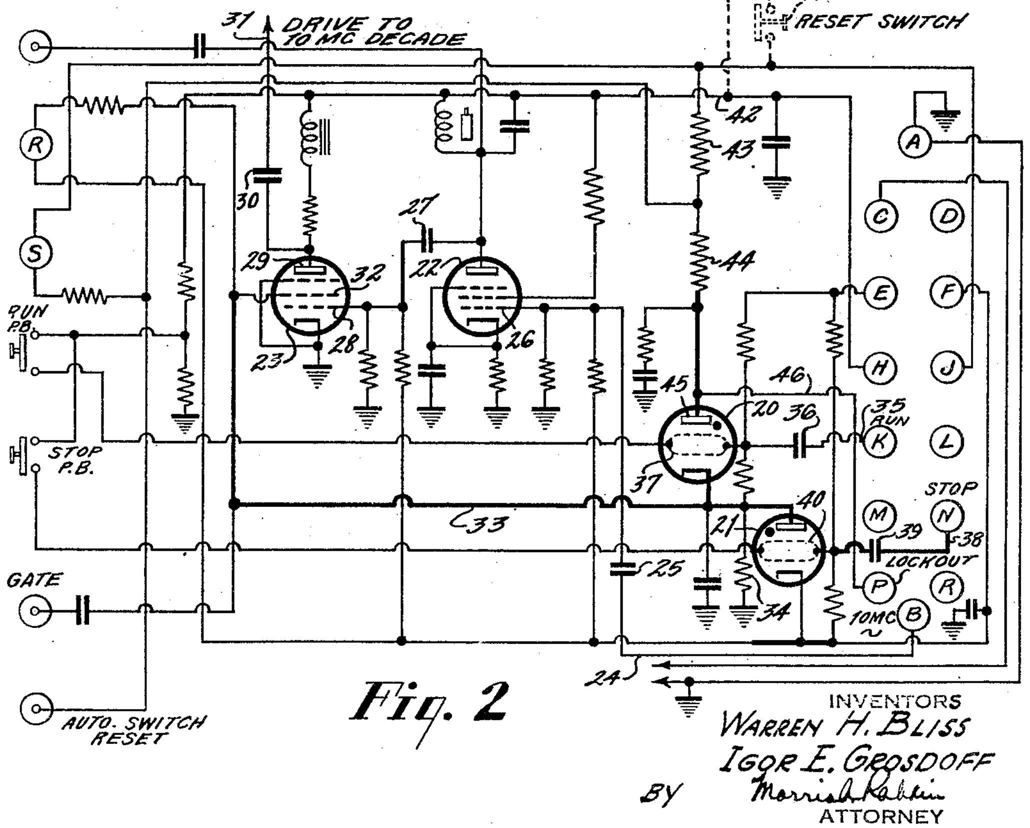
Figure 2 shows the connections of a circuit represented by the block 18 of Figure 1. This circuit is old and is included only to facilitate an understanding of the circuit of Figure 3.

The pulses to be counted are applied from an input lead 17 through a switch and amplifier 18 to the input of the decade 10. The circuit connections represented by the box 18 are shown in Figure 2 and are disclosed in a copending application of Igor E. Grosdoff, Serial No. 18,054, filed March 30, 1948, now Patent No. 2,545,083 dated March 13, 1951.

Figure 3:
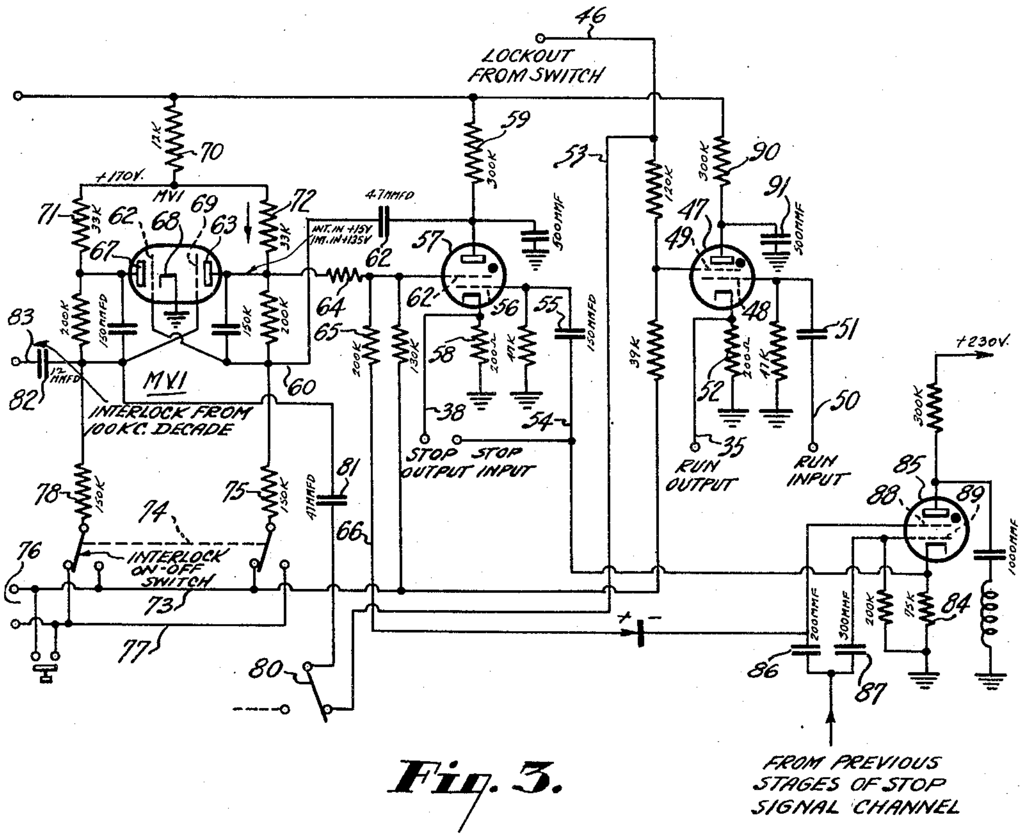
Figure 3 shows the connections of the improved control circuit of the present invention. In this figure, the constants of the various circuit components are indicated by legends placed adjacent to them.

Operation of the switch and amplifier 18 is controlled by an interlock and lockout device 19. The connection of the device 19 and its connections to other parts of the control circuit are shown in Figure 3.

As indicated by Figure 2, the box 18 of Figure 1 represents a circuit which includes a "run" thyratron 20, a "stop" thyratron 21, an amplifier 22 and a driver tube 23. An oscillator (not shown) is connected through a lead 24 and a capacitor 25 to the grid 26 of the amplifier 22. The oscillations amplified by the amplifier 22 are applied through a capacitor 27 to the grid 28 of the driver tube 23 which has its anode 29 connected through a capacitor 30 and a lead 31 to the input of the decade 10 of Figure 1.

Whether or not the oscillations applied to the grid 28 are transmitted to the decade 10 is determined by the potential of the grid 32 of the driver tube 23.

The potential of the grid 32 is determined by the current conductive conditions of the thyratrons 20 and 21. When neither of the thyratrons is conducting current, the grid 32 and its input lead 33 are at a potential such that the oscillations are blocked by the tube 23. When the "run" thyratron 20 is conducting, current flows through a resistor 34 and the potential of the lead 33 is raised to a value such that the oscillations are transmitted through the tube 23 to the decade 10. When both the thyratrons 20 and 21 are conducting, the potential of the lead 33 is reduced to a value such that the supply of oscillations through the tube 23 is interrupted.

In the standby condition of the circuit, both the thyratrons are non-conducting. The supply of oscillations to the counter is started by the application of a positive pulse through a lead 35 and a capacitor 36 to the grid 37 of the "run" thyratron 20 and is stopped by the application of a positive pulse through a lead 38 and a capacitor 39 to the grid 40 of the stop thyratron. The thyratrons 20 and 21 are reestablished in a nonconductive condition by momentarily opening a reset switch 41 which connects a +B lead 42 through resistors 43 and 44 to the anode of the thyratron 20.

Connected to the anode 45 of the thyratron 20 is a lockout lead 46 which has its voltage determined by the voltage drop of the resistors 43 and 44. The purpose of this lockout lead will appear in connection with the description of Figure 3.

In the switching circuit of Figure 2 stop tube 21 is interlocked to start tube 20 since tube 21 cannot fire until after tube 20 has been turned on. Both of these tubes 20 and 21 lockout individually as soon as they operate and cannot be operated again until reset switch 41 is manipulated. Conduction through each of these tubes is continuous from the time it is tripped until it is reset.

Other features illustrated by Figure 2 are described in the latter of the above copending applications but are not essential to an understanding of the present invention which relates more particularly to the circuit shown in Figure 3.

Figure 3 shows a thyratron 47 which includes grids 48 and 49 and is made conductive by a position "run" pulse applied to the grid 48 through a lead 50 and a capacitor 51. When the thyratron conducts, current is drawn through resistor 52 and the voltage of the lead 35 is raised to a value such that the thyratron 20 of Figure 2 conducts. When the thyratron 20 conducts, the voltage of the lead 46, the grid 49 of the thyratron 47 and lead 53 are made more negative. The purpose of the lead 53 will be explained in connection with the description of another part of the circuit. The thyratron 47 is operated with its grid 48 at zero bias and its grid 49 at —3 volts. The voltage of the grid 49 is decreased —20 volts when the "run" thyratron 20 of Figure 2 conducts. This prevents further operation of the thyratron 47.

A positive pulse for stopping the supply of oscillations to the decade 10 is applied from a lead 54 through a capacitor 55 to a grid 56 of a thyratron 57. As a result, a sharp positive polarity pulse is developed on lead 38 from the upper terminal of cathode lead resistor 58 and the "stop" thyratron 21 is made to conduct. For a purpose to be explained, a negative pulse is applied from the lower terminal of anode lead resistor 59 through a capacitor 61 to a lead 60.

The thyratron 57 is operated with its grid 56 at zero bias. The voltage of its grid 62 is derived from the anode 63 of a trigger circuit switch MV1 and has a value of —10 volts when current conduction is not through the anode 63 and a value of —40 volts when current conduction is through the anode 63. The anode 63 is also connected through resistors 64 and 65 to a lead 66 which is connected to the grid of the last stage of the stop signal input channel as hereinafter described.

The purpose of placing start and stop tubes 47 and 57 in tandem with and ahead of similar tubes 20 and 21 is to prevent erroneous pulses from getting from the start and stop pulse sources to driver tube 23. When start and stop tubes 20 and 21 only are used it is possible by inter-electrode capacity to pass pulses through these tubes even after lockout.

Gas tubes 47 and 57 are operated in a self-restoring circuit and do not have to be reset. For example when tube 47 is triggered it quickly discharges condenser 91. When the voltage of condenser 91 has dropped sufficiently, conduction through tube 49 ceases for lack of voltage to maintain ionization of the gas. Condenser 91 then recharges through resistor 90. Lockout is affected in these tubes by depressing the voltage of No. 2 grid to a sufficiently negative value.

The switch MV1, hereinafter called the interlock switch, is a trigger circuit of the type which includes a pair of triodes 67—62—68 and 63—69—68, the cathode 68 being common to the two triodes. The triodes have operating voltage to their anodes from a +225 volt lead through a common resistor 70 and separate resistors 71 and 72, have their common cathode 68 connected to ground, and have their anodes each cross-connected to the grid of the other through a resistor which is shunted by a capacitor. A bias potential of —67 volts is applied through a lead 73, an interlock "on-off" switch 74 and a resistor 75 to the grid 62. A similar bias potential is applied to the grid 69 from the lead 73 through a reset switch 76, a lead 77, the switch 74 and a resistor 78.

As is well known, momentary opening of the switch 76 is effective to establish current conduction in the anode 63. Current conduction is stable in either one or the other of the anodes 67 or 63 and is transferred from one to the other either in response to the application of a positive pulse to the grid of the triode which is not conducting or in response to the application of a negative pulse to the grid of the triode which is conducting.

The switch MV1 can be reset to either current conducting condition by the switch 74. If it is preset with current conduction in the anode 63, the thyratron 57 is biased off and a stop pulse applied to the lead 54 is ineffective to interrupt the supply of oscillations to the decade 10. With current conduction through the anode 67, however, the tube 57 is in condition to transmit the stop pulse to the grid 40 of the stop thyratron 21 of Figure 2.

The lead 53 is connected through a switch 80 and a capacitor 81 to the grid 69 of the switch MV1. As previously indicated, this lead 53 is connected through a lead 46 to the anode 45 of the start or run thyratron 20 of Figure 2 and is at —3 volts when neither of the thyratrons 20 or 21 is conducting, at —20 volts when the thyratron 20 is conducting, and at —50 volts when both 20 and 21 are conducting.

The purpose of switch 80 is to allow for either immediate or delayed release of interlock. When switch 80 is closed as shown, the passage of a start pulse causes lead 46 to suddenly drop in potential and trip interlock multivibrator MV1. This causes conduction in the right hand side of MV1 to cease and the No. 2 grid of tube 57 is brought up to the point where it can be triggered.

When switch 80 is open the tripping of MV1 is delayed until a pulse is received on lead 83 from decade 12 of Figure 1.

The grid 69 is also connected through a capactor 82 and a lead 83 to the output of the 100 kc. decade 12 of Figure 1. When the decade 12 completes its first cycle of operation, its output is applied to the grid 69.

The stop pulse applied to the lead 54 is derived from the upper terminal of a resistor 84 which is connected in the cathode lead of a tube 85 which is the last stage of the channel through which the stop pulse is applied. Such stop pulse is applied through capacitors 86 and 87 to the grids 88 and 89 of the tube 85. The grid 89 is biased to zero volts and the bias voltage of grid 88 is either −10 or −40 volts depending on the current conductive condition of the switch MV1. With the anode 63 conducting, the voltage of the grid 88 is −40 volts which is sufficient to prevent firing of the tube 85. Approximately 140 micro-seconds after the application of the run or start pulse, current conduction shifts to the anode 67 of the interlock switch, the voltage of the grid 88 is changed to −10 volts, and the tube is in condition to transmit a stop pulse to the lead 54.

Assuming current conduction to be in the anode 63 as indicated by the arrow, the application of a start pulse to the lead 50 of Figure 3 results in energization of the start thyratron 20 of Figure 2 and the application of a negative pulse to the grid 69 by which current conduction is shifted to the anode 67. With no current flowing through the resistor 72 and the anode 63, the tubes 57 and 85 are in condition to transmit a stop pulse. When such stop pulse is applied, the tubes 57 and 85 conduct and there is applied from the anode of the tube 57 to the grid 62 of the switch MV1 a negative pulse by which current conduction is returned to the anode 63.

Under these conditions the tubes 47 and 57 are individually locked out so that they are non-receptive to any further signals that may come over the start and stop channels.

Instead of locking out the stop pulse by the tube 57 as explained above, it may be locked out by a positive pulse applied from the output stage of the decade 12 of Figure 1, such positive pulse being applied through the lead 83 and the capacitor 82 to the grid 69 of the interlock switch MV1. This interlock functions in a manner similar to the lockout between the tube 20 of Figure 2 and the switch MV1 and tube 57 of Figure 3 except that it prevents operation of the "stop" channel during the 100 micro-seconds of timing.

The interlock switch MV1 is required for single line operation but may be made ineffective by the switch 74 when the time interval to be measured is shorter than 100 micro-seconds. Thus with the switch 74 closed to the right, the switch MV1 is preset with current conduction in the anode 63, the effect of the positive pulse applied to the grid 69 through the lead 83 is neutralized by the negative voltage of the lead 53 and the stop pulse is locked out only in response to the application of a stop pulse to the lead 54 of Figure 3 as previously explained.

What the invention provides is a counter control circuit including start and stop channels which are so interconnected that the stop channel is locked out until a start pulse has been applied to the input of the start channel. The interconnections between these two channels is such that the start channel is locked out and the stop channel is opened in response to the application of a start pulse. The application of a stop pulse, either to the input of the stop channel or from a predetermined stage of the counter, is effective to terminate the counting of the counter and to lock out the stop channel.

What is claimed is:

1. In a circuit for controlling the supply of constant frequency oscillations to a counter, the combination of a normally open start channel, a normally blocked stop channel, means connected in said start channel and responsive to a start pulse applied to said start channel for applying a lockout voltage to said start channel, an interlock switch connected to said stop channel and responsive to said lockout voltage for opening said stop channel, and means connected between said stop channel and said switch for blocking said stop channel in response to the application of a stop pulse to said stop channel.

2. In a circuit for controlling the supply of constant frequency oscillations to a counter, the combination of a normally open start channel, a normally blocked stop channel, means connected in said start channel and responsive to a start pulse applied to said start channel for applying a lockout voltage to said start channel, an interlock switch connected to said stop channel, means for applying said lockout voltage to said switch for opening said stop channel, means connected between said stop channel and said switch for blocking said stop channel in response to the application of a stop pulse to said stop channel, and means for alternatively applying an output voltage from a stage of said counter to said switch for opening said stop channel.

3. In a circuit for controlling the supply of constant frequency oscillations to a counter, the combination of a normally open start channel, a normally blocked stop channel, means connected in said start channel and responsive to a start pulse applied to said start channel for applying a lockout voltage to said start channel, an interlock switch connected to said stop channel, means connected between an output stage of said counter and said switch, and means for operating said switch to a condition such that said stop channel is blocked until a pulse is applied to said switch from said output stage.

WARREN H. BLISS.
IGOR E. GROSDOFF.

REFERENCES CITED

The following references are of record in the file of this patent:

UNITED STATES PATENTS

| Number | Name | Date |
|---|---|---|
| 2,403,918 | Grosdoff | July 16, 1946 |